March 23, 1965  M. G. GIESLER, SR  3,175,079
VEHICLE TROUBLE LIGHT
Filed Dec. 27, 1961
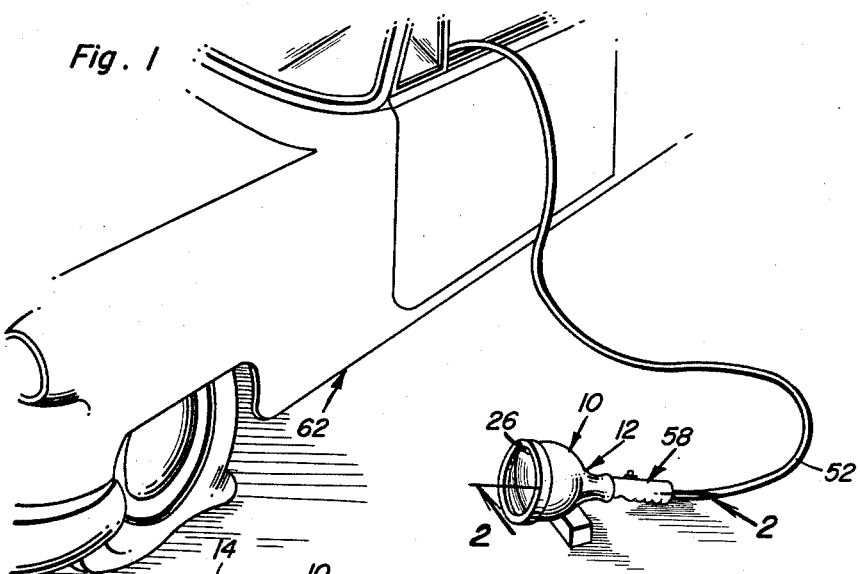
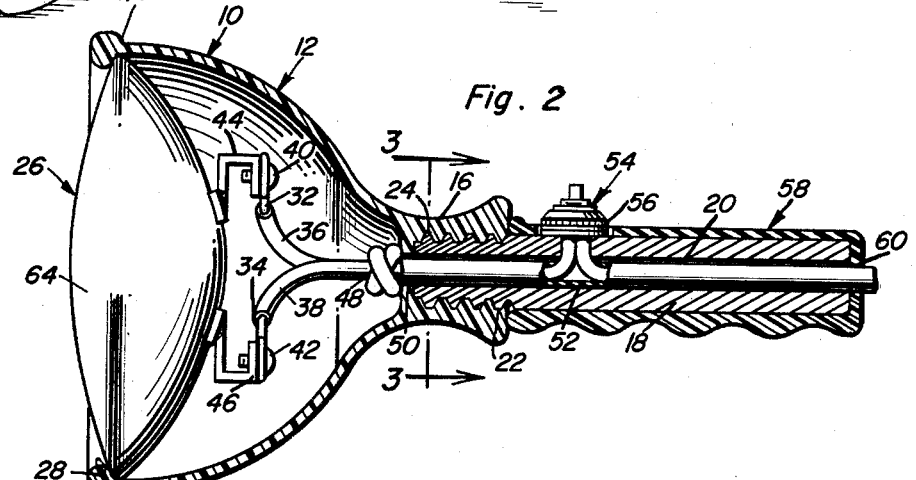
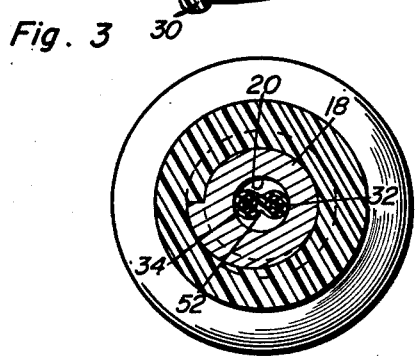
Merle G. Giesler, Sr.
INVENTOR.
BY
Attorneys ves,

United States Patent Office

3,175,079
VEHICLE TROUBLE LIGHT
Merle G. Giesler, Sr., R.F.D. 1, Box 8, Savanna, Ill.
Filed Dec. 27, 1961, Ser. No. 162,491
6 Claims. (Cl. 240—8.18)

This invention relates to a novel and useful vehicle trouble light and more specifically to a bell shaped holder or shield constructed of deformable and resilient elastomeric material having an enlarged open end and a diametrically reduced neck portion on the end remote from the open end. A conventional type of sealed beam lamp is removably secured in the open large diameter end portion of the bell shaped holder and shield and the holder is provided with a handle portion having a switch for turning the trouble light on and off. A conventional type of sealed beam lamp includes a pair of terminals and a pair of electrical conductors are provided with corresponding ends secured to the terminals of the sealed beam lamp. The handle of the trouble light is removably secured within a longitudinal bore formed in the neck portion of the holder and passage means is provided for communicating the interior of the large diameter end portion with the interior of the neck portion. The handle is provided with a longitudinal bore and the pair of conductors passed through the longitudinal bore formed in the handle and are provided with suitable means (not shown) such as a male plug adapted for engagement with a suitable source of electrical potential of the vehicle with which the lamp is associated. A convenient source of electrical potential would be the conventional type of cigarette lighter socket.

The main object of this invention is to provide a vehicle trouble light having a bell shaped holder or shield constructed in a manner whereby a sealed beam lamp may be removably secured therein and cushioned against shock in the event the vehicle trouble light is dropped.

A further object of this invention, in accordance with the immediately preceding object, is to provide a bell shaped holder and shield constructed of deformable and resilient elastomeric material in which a sealed beam lamp may be substantially entirely enclosed and supported in a manner whereby the dropping of the trouble light will be in most cases ineffective to break the sealed beam lamp or to dislodge the latter from the bell shaped holder and shield.

A further object of this invention is to provide a vehicle trouble light whose electrical connections are completely enclosed within a watertight housing so as to render the trouble light water resistant and thus usable during inclement weather.

A final object to be specifically enumerated herein is to provide a vehicle trouble light which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a vehicle shown with the vehicle trouble light associated therewith and positioned to cast a beam of light on the front left wheel of the vehicle;

FIGURE 2 is an enlarged fragmentary sectional view taken substantially upon the plane indicated by the section line 2—2 of FIGURE 1; and FIGURE 3 is an enlarged transverse vertical sectional view taken substantially upon a plane indicated by the section line 3—3 of FIGURE 2.

Referring now more specifically to the drawings the numeral 10 generally designates the vehicle trouble light of the instant invention. The trouble light 10 comprises a generally bell shaped holder and shield generally referred to by the reference numeral 12 and which is constructed of deformable and resilient elastomeric material such as rubber. The holder and shield 12 includes an open large diameter end portion 14 and a diametrically reduced neck portion 16. An elongated wooden handle 18 is provided and has a longitudinal bore 20 formed therethrough. The neck portion 16 has a threaded longitudinal bore 22 formed therein and one end of the handle is externally threaded as at 24 and is threadedly engaged in the bore 22.

A sealed beam lamp assembly generally referred to by the reference numeral 26 is provided and is substantially circular in plan. The open end 14 of the shield 12 includes an integral inwardly directed retaining lip 28 behind which the sealed beam lamp assembly 26 is held captive. In addition, it will be noted that the open end 14 of the shield 12 also includes an outwardly projecting annular abutment rib 30 which is radially alined with the retaining lip 28.

A pair of electrical conductors 32 and 34 are covered with suitable insulation material 36 and 38 respectively and are connected at corresponding ends by means of fasteners 40 and 42 to the pair of terminals 44 and 46 of the sealed beam lamp assembly 26. The conductors 32 and 34 are knotted as at 48 and it will be noted that a passageway 50 communicates the inner end of the bore 22 with the interior of the large diameter end 14 of the shield 12. The pair of conductors 32 and 34 are encased within a covering 52 of dielectric material and are passed through the longitudinal bore 20 formed in the wooden handle 18. However, an on-off switch assembly generally referred to by the reference numeral 54 is secured to the wooden handle in any convenient manner as at 56 and the on-off switch 54 is interposed in the electrical conductor 32 whereby the electrical circuit defined by the conductors 32 and 34 and the terminals 44 and 46 may be opened and closed by means of the switch assembly 54.

A suitable covering generally referred to by the reference numeral 58 and constructed of suitable waterproof and dielectric material such as plastic is disposed about the exposed portion of the wooden handle 18 and includes an apertured end wall 60 through which the covering 52 projects. It will be noted that the ends of the conductors 32 and 34 remote from the terminals 44 and 46 may be operatively connected to a cigarette lighter adapter plug of conventional design whereby the trouble light 10 may be operatively connected to the electrical potential (not shown) of the vehicle generally referred to by the reference numeral 62 by plugging such a cigarette lighter adapter plug within the cigarette lighter socket (not shown) provided in the vehicle 62.

If the vehicle trouble light 10 should be dropped and any portion thereof other than the open end 14 of the bell shaped holder and shield strikes a hard object, the resilient elastomeric material of which the shield 12 is constructed will protect the sealed beam light assembly 26 from breakage. Additionally, should the vehicle trouble light be dropped onto a hard surface in such a manner that the abutment rib 30 strikes the hard surface, initial impact of the abutment rib 30 with the supporting surface will cause that portion of the abutment rib 30 and the corresponding portion of the retaining lip 28 to be deflected inwardly across the light diffusing lens 64 of the sealed beam light assembly 26. As the abutment rib 30 and retaining lip 28 are being deformed and inwardly and laterally offset, the impact of the vehicle trouble light striking the hard surface will be substantially completely absorbed and thus the sealed beam light assembly 26 will be protected from breakage. Additionally, the retaining lip 28 projects inwardly a sufficient amount in order to prevent the sealed beam light assembly 26 from being accidentally dislodged from within the open end 14 of the shield 12.

The vehicle trouble light has been constructed in such a manner whereby its manufacture may be accomplished at an extremely low cost to the consumer. The sealed beam unit or lamp 26 may be of the type which is now manufactured with a diameter of 4¼" and the holder and shield 12 may be conveniently constructed by slightly modifying the rubber cup portion of a conventional type of plumbing plunger with a diameter of 4½". The wooden handle of a conventional plumbing plunger may be used as the handle 18 and suitably provided with the longitudinal bore 20 and the switch 54 and covering 58. Therfore, it may be seen that the vehicle trouble light is constructed in a manner whereby maximum protection will be afforded the sealed beam lamp 26 while maintaining the cost of the trouble light at a minimum due to the mass production basis by which plumbing plungers are now being constructed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle trouble light comprising a generally bell-shaped holder and shield defining a longitudinal center axis and constructed of deformable and resilient elastomeric material and including an open large diameter end and a diametrically reduced hollow neck portion on the end remote from said open end communicated with the latter, an elongated handle, means securing one end of said handle in said neck portion, a sealed beam lamp including a front lens, said open end of said shield including an inner annular thickened portion defining an integral inwardly directed annular retaining lip of appreciable axial extent, said sealed beam lamp including terminal means and being disposed in said open end of said shield and removably secured therein immediately to the rear of said retaining lip with the outer peripheral portions of said lamp snugly and frictionally gripped by the inner surfaces of the portions of said larger diameter end of said holder disposed immediately adjacent and behind said inwardly directed lip and said lip overlying the outer peripheral portions of the outer surface of said lens, a pair of electrical conductors secured to said terminal means extending through said neck portion and at least said one end of said handle and adapted to be electrically connected to a suitable source of electrical potential, said open end of said shield also including an outer annular thickened portion defining an outwardly projecting annular abutment rib also of appreciable axial extent and radially aligned with said retaining lip and being disposed at least substantially entirely forwardly of a plane containing the maximum diameter portions of said lamp whereby if said trouble light is dropped on its side said abutment rib will first strike the surface on which said light is dropped and be deflected, together with a corresponding portion of said retaining lip, radially inwardly across the outer face of said lens thereby stretching the adjacent portions of said holder engaged with the maximum diameter portions of said lamp and causing a major portion of the force of impact to be absorbed by the radial displacement of said lip and rib prior to the engagement of the portions of the holder disposed in contact with the maximum diameter portions of said lamp with said surface, which portions of said holder will then absorb the remaining portion of the impact.

2. The combination of claim 1 wherein said hollow neck portion is internally threaded and said one end of said handle is threadedly engaged in said neck portion.

3. The combination of claim 2 wherein said handle has a longitudinal bore formed therein opening through at least said one end thereof, the ends of said electrical conductors remote from said terminals being passed through said longitudinal bore.

4. The combination of claim 3 wherein said handle includes an on-off switch including a pair of terminals interposed in one of said electrical conductors.

5. The combination of claim 4 wherein said shield is constructed of rubber and said handle is constructed of wood.

6. The combination of claim 5 wherein said wooden handle is provided with a waterproof covering constructed of dielectric material.

References Cited by the Examiner
UNITED STATES PATENTS

| | | | |
|---|---|---|---|
| 1,411,209 | 3/22 | Foster | 240—52.3 |
| 1,700,167 | 1/29 | Kollath | 240—54 |
| 2,176,084 | 10/39 | Lennan | 240—41.5 X |
| 2,334,900 | 11/43 | Bosten et al. | 240—54.2 |
| 2,485,429 | 10/49 | Buchard | 240—52.3 X |
| 2,641,752 | 6/53 | Naymik | 240—8.18 X |
| 2,658,136 | 11/53 | Morgenstern et al. | 240—8.18 |
| 2,681,979 | 6/54 | Manoloff | 240—2.18 X |

NORTON ANSHER, *Primary Examiner.*